Aug. 14, 1956     A. J. PRITCHARD ET AL     2,758,896
VEHICLE DRIVE SHAFT SLEEVE BEARING

Filed Nov. 9, 1953     2 Sheets-Sheet 1

Arnold J. Pritchard
Willard A. Rowlette
INVENTOR.

BY Loyal J. Miller

ATTORNEY

Aug. 14, 1956

A. J. PRITCHARD ET AL 2,758,896

VEHICLE DRIVE SHAFT SLEEVE BEARING

Filed Nov. 9, 1953

Arnold J. Pritchard
Willard A. Rowlette
INVENTOR.

BY Loyal J Miller

ATTORNEY

United States Patent Office 2,758,896
Patented Aug. 14, 1956

2,758,896

VEHICLE DRIVE SHAFT SLEEVE BEARING

Arnold J. Pritchard, Carnegie, and Willard A. Rowlette, Fort Cobb, Okla.

Application November 9, 1953, Serial No. 390,842

2 Claims. (Cl. 308—237)

The present invention relates to the art of automotive chassis construction, and more particularly to bearing surfaces for the forward end of an automotive drive shaft.

It is conventional practice with most automobile manufacturers to connect the forward end of the drive shaft to the rear member of the universal joint by co-operating splines on the drive shaft and within the universal joint member. This splined connection is held in place within the drive shaft or torque tube housing, by two relatively short tubular bearings, one around the universal joint rear terminal member and one around the drive shaft behind the universal joint member. There is a constant transverse movement against these bearings by the revolving splined joint which in time wears the bearings, causing an undue amount of strain upon the universal joint, and allows the universal joint lubricant to leak past the bearings rearwardly within the torque tube housing, overfilling the differential joint housing and forcing lubricant out into the drums of the rear wheels. At the same time the bearings wear the exterior surface of the universal joint rear terminal member and the drive shaft, to such an extent that new bearings will not fit tight enough to stop the loss of lubricant, thus necessitating the dismantling of the parts and resurfacing the worn areas. These bearings are not easily replaced, particularly the rearmost one around the drive shaft. The necessary expense for the labor involved in replacing the bearings when they are just slightly worn influences most automobile owners to continue operating the vehicle until serious damage has been done to the affected parts.

Earlier automobile models used just one relatively short bearing around the drive shaft behind the universal joint rear terminal member and the comparatively short life of this bearing made some modification imperative. This modification was the addition of the forward short bearing around the rear terminal member of the universal joint, as descrbied above, which was a definite improvement, but is still not satisfactory.

The present invention is so designed that it may be installed in place of the above described bearings and provide twice or more bearing surfaces.

Another important object is to provide a bearing that may be installed on a worn drive shaft assembly without resurfacing worn surfaces.

A similarly important object is to provide a bearing that may be installed by any one skilled in the art without the use of "special tools."

Another object is to provide a bearing in which all wearing surfaces are contained on the inside of the bearing.

Still another object is to provide a bearing that may be easily replaced when worn.

Yet another object is to provide a bearing with a lubricant sealing ring that revolves with the drive shaft.

The invention accomplishes these objects by a tubular bearing around and rotating with the splined universal drive-shaft joint concentrically disposed within a similar tubate bearing adjacent the inner wall of the torque tube housing.

Other objects will be apparent from the following description when taken in conjunction with the accompanying two sheets of drawings, wherein.

Like characters of reference designate like parts in those figures of the drawings in which they occur.

In the drawings.

Figure 1:
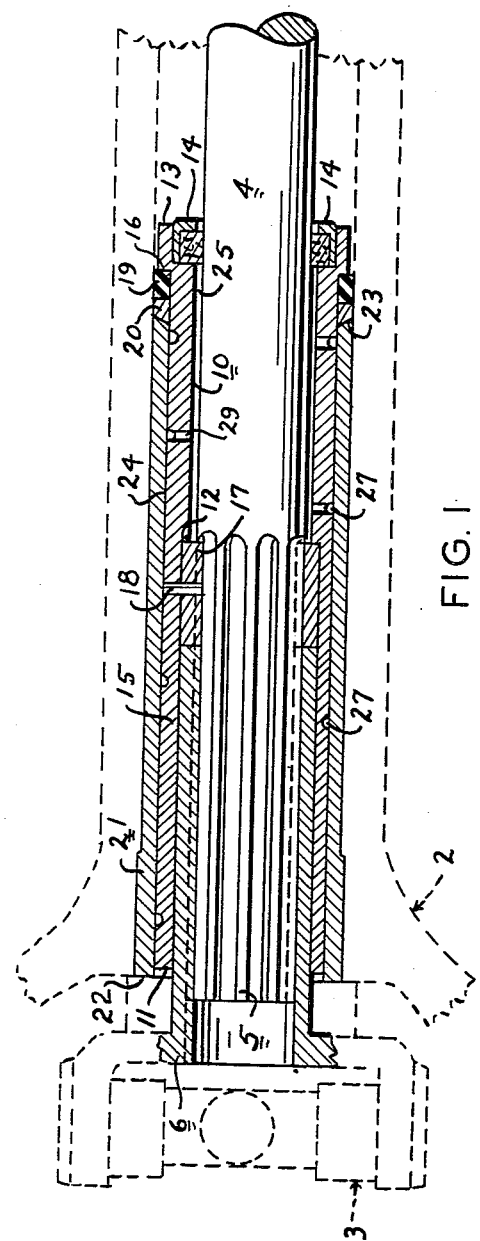
Figure 1 is a horizontal cross-sectional view of the device and a splined joint, and showing in dotted lines a fragment of a torque tube housing and a universal joint.

Reference numeral 1 indicates, as a whole, a fragment of the forward end portion of an automotive vehicle torque tube.

Reference numeral 2 indicates a fragment of the torque tube housing.

Reference numeral 3 indicates a fragment of a universal joint, shown in dotted lines.

Figure 2:
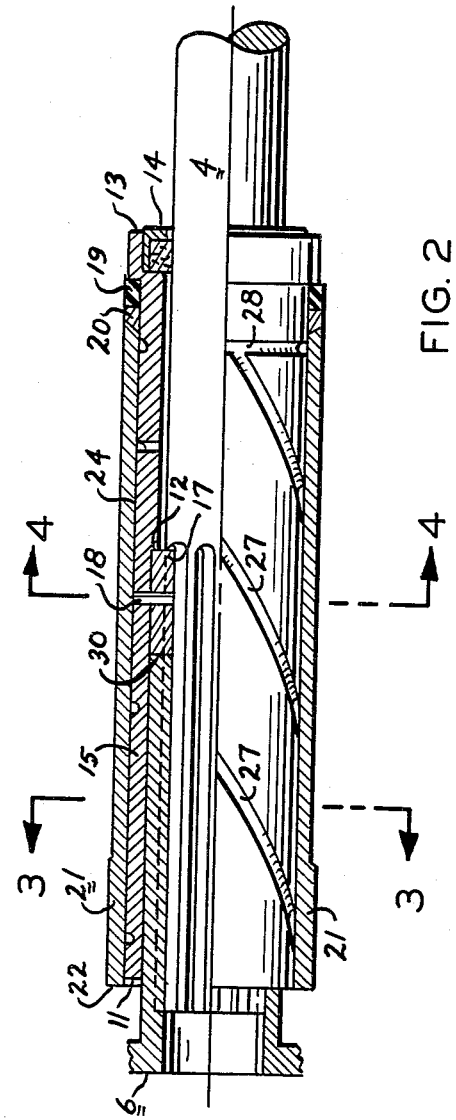
Figure 2 is a horizontal cross-section view, similar to Fig. 1, showing a portion of the device in elevation.
Figure 5:
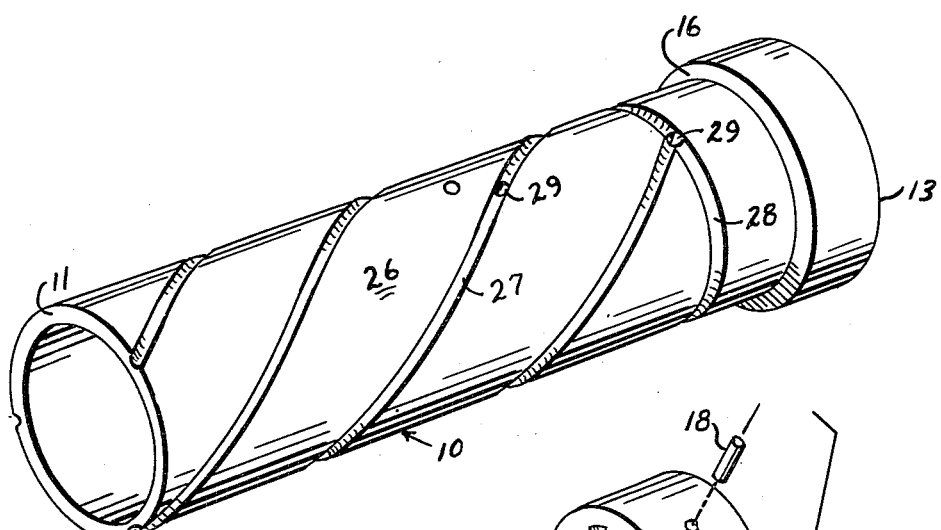
Figure 5 is a perspective view of one part of the device.
Figure 6:
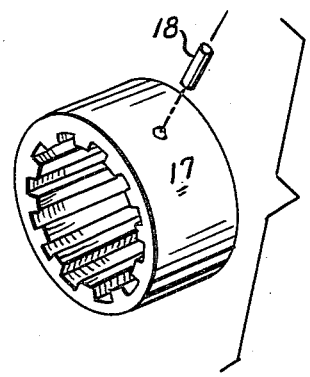
Figure 6 is an exploded perspective view of another portion of the device.
Figure 4:
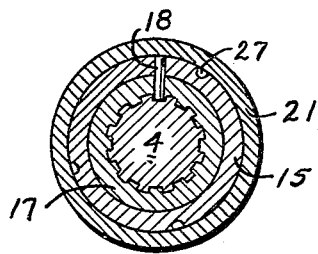
Figure 4 is a vertical cross-sectional view taken substantially along line 4—4 of Fig. 2.
Figure 3:
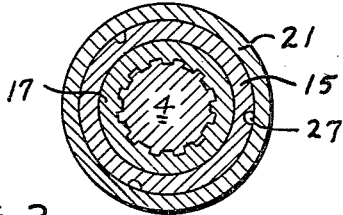
Figure 3 is a vertical cross-sectional view taken substantially along line 3—3 of Fig. 2.

Reference numeral 4 indicates a conventional drive shaft concentrically disposed within the torque tube housing 2, having its forward end portion 5 externally splined as is customary. The splined end 5 is slidably disposed within a co-operating internally splined rearwardly projecting terminal member 6 of the universal joint 3, shown in cross-section lines in Figs. 1 and 2.

The present invention is designed to be installed around the periphery of the above described splined joint within the torque tube housing 2 to provide a bearing surface for supporting the splined joint against transverse movement or wobble, without subjecting the exterior of the splined joint or the bore of the torque tube housing to wear.

A metal tubate sleeve 10, having a bore larger than the drive shaft 4, is bored to fit the exterior of the terminal member 6 from the forward end 11 to a point intermediate its ends, ending abruptly in an inwardly flared shoulder 12. The rear end 13 of sleeve 10, is bored to receive a packing gland and ring 14 for the purposes more fully explained hereinbelow.

The sleeve 10 is of sufficient length to extend a substantial distance along the splined end of the drive shaft 4, and is preferably so as long as other factors will permit to obtain maximum bearing surface as explained hereinbelow.

The periphery of the sleeve 10 is turned down, as by a lathe, from its forward end 11, leaving a wall 15, to a point adjacent its rear end 13, ending abruptly in an outwardly flared shoulder 16 perpendicular to the wall 15.

A comparatively short metal tubate sleeve 17 internally plurally splined by broaching or other suitable means, to co-operate with the externally splined drive shaft 4, its periphery machined to fit the bore of the bored end 11, is placed within the sleeve 10 adjacent the shoulder 12. The short sleeve 17 is held rigidly in place by a pin 18 through the wall of the short sleeve 17 and the wall 15 of the sleeve 10, or if preferred it may be pressed in place.

A rubber sealing ring 19, rectangular in cross-section, is placed around the periphery of the wall 15, adjacent the shoulder 16. A seating ring 20, having a bore slightly larger than the periphery of the wall 15 and a periphery smaller than the bore of the torque tube housing 2, is placed on the sleeve 10, adjacent the sealing ring 19.

An outer tubate metal sleeve 21, having such outer dimensions that it may be closely received in the forward end of the torque tube housing 2, is bored to a bearing tight fit with the periphery of the wall 15, and is concentrically disposed within the housing 2, surrounding the wall 15 of the inner sleeve 10. The outer sleeve 21 is of sufficient length that together with the seating ring 20 and the sealing ring 19 against the shoulder 16, its longitudinal axis is slightly greater than the inner sleeve 10. The forward end 22 of the outer sleeve 21 extends forwardly over the end 11 of the inner sleeve 10. The universal joint presses against the end 22, holding the rear end 23 of the outer sleeve 21 against the seating ring 20, which slightly compresses the rubber sealing ring 19 to retain the bearing lubricant.

The bearing surface comprising; the bore of the outer sleeve 21 and the periphery of the inner sleeve wall 15, as indicated by the line 24, is lubricated by lubricant gravitating from the universal joint and transmission housing, through the splined joint of the drive shaft 4, and within the inner sleeve 10. The packing ring 14 prevents lubricant loss rearwardly around the drive shaft 4 from the space 25. The periphery 26 of the wall 15, has a plurality of helical grooves 27 extending from the forward end 11 rearwardly and ending in an annular groove 28, around the periphery 26 near the shoulder 16. A plurality of through perforations 29, in the wall 15, communicate with the grooves 27 and 28 and the lubricant filled space 25. The gravitational force of the lubricant from the universal joint, as explained above, forces lubricant through the perforations 29, into the grooves 27, and is distributed over the bearing surface 24 by the rotation of the inner sleeve 10.

*Operation*

After the drive shaft and universal joint have been disconnected and the worn conventional bearings have been removed from the torque tube housing, the invention device is assembled, as described above, and placed over the splined end of the drive shaft 4, with the end 13 rearward, and pushed rearwardly on the drive shaft 4 until the rear end of the internally splined ring 17 reaches the rear end of the splines 5. The terminal member 6, of the universal joint 3, is placed over the forward end of the splines 5, as is customary, and within the bored end 11 of the inner sleeve 10. The rear end of the terminal member 6 contacts the forward end of the short sleeve 17, as indicated by the line 30, to hold the short sleeve 17 adjacent the terminal end of the splines 5.

As the drive shaft rotates, it turns the short sleeve 17 and attached inner sleeve 10 together with the terminal member 6 of the universal joint 3 within the outer sleeve 21.

Obviously length bearing surface 24 being twice or more greater than the conventional bearings, and all the wear confined to this surface, the length of time and usage between replacements has been considerably extended.

Obviously the invention is susceptible to some change or alteration without defeating its practicability, and we therefore do not wish to be confined to the preferred embodiment shown in the drawings and described herein, further than we are limited by the scope of the appended claims.

We claim:

1. A bearing for journaling an automobile drive shaft in a drive-shaft housing, said drive shaft exteriorly splined at its forward end portion and co-operatingly received by an internally splined universal joint terminal member, comprising: an elongated outer sleeve extending from the forward end of said drive-shaft housing to a point rearwardly of the splines of said drive-shaft and having a periphery received closely by the bore of said drive-shaft housing, said outer sleeve having a smooth bore providing a bearing surface; and an elongated inner sleeve, the periphery of which is in bearing contact with and in co-operation with the smooth bore of said outer sleeve, the bore of said inner sleeve surrounding the forward end portion of said drive shaft and having a rigid internally splined sleeve intermediate its ends engaging the said splines on said drive shaft rearwardly of said universal joint terminal member, said splined sleeve extending throughout only a portion of the longitudinal length of said inner sleeve, said splined sleeve being the only portion of said inner sleeve in contact with said drive shaft.

2. A bearing for journaling an automobile drive-shaft in a drive-shaft housing, said drive shaft exteriorly splined at its forward end portion and co-operatingly received by an internally splined universal joint terminal member, comprising: an elongated outer sleeve extending from the forward end of said drive-shaft housing to a point rearwardly of the splines of said drive-shaft and having a periphery closely received by the bore of said drive-shaft housing, said outer sleeve having a smooth bore providing a bearing surface; and an elongated inner sleeve disposed within said outer sleeve and surrounding said drive shaft in spaced-apart relation therewith, the periphery of said inner sleeve having a smooth finish providing a smooth bore in co-operation with the bearing surface of said outer sleeve, said inner sleeve having one end portion bored for receiving the exterior of said universal joint terminal member, the bore of said inner sleeve having a rigid internally splined sleeve intermediate its ends engaging the splines on said drive shaft rearwardly of said universal joint terminal member, said splined sleeve extending throughout only a portion of the longitudinal length of said inner sleeve, said splined sleeve being the only portion of said inner sleeve contacting said drive shaft.

References Cited in the file of this patent

UNITED STATES PATENTS

| | | |
|---|---|---|
| 2,403,520 | Gerner | July 9, 1946 |
| 2,540,515 | Gerner | Feb. 6, 1951 |
| 2,625,448 | Underwood | Jan. 13, 1953 |